United States Patent

[11] 3,574,451

| [72] | Inventor | Achille Lazazzera<br>48 Moherman Ave., Youngstown, Ohio 44509 |
|---|---|---|
| [21] | Appl. No. | 832,619 |
| [22] | Filed | June 12, 1969 |
| [45] | Patented | Apr. 13, 1971 |

[54] SPECTACLE FRAME
5 Claims, 5 Drawing Figs.

[52] U.S. Cl. ............................................. 351/121, 351/140
[51] Int. Cl. ............................................. G02c 5/14, G02c 5/20
[50] Field of Search .......................... 351/118, 119, 121, 140, 153, 89, 103, 99, 100; 16/128; 287/92

[56] References Cited
UNITED STATES PATENTS

| 2,756,632 | 7/1956 | Parsell ........................... | 351/121 |
| 3,241,904 | 3/1966 | Ditto ............................. | 351/121 |

*Primary Examiner*—David Schonberg
*Assistant Examiner*—Robert L. Sherman
*Attorney*—Brown, Murray, Flick & Peckham ABSTRACT: A novel hinge structure is disclosed for attaching the temples to the frontal lens carrying frame of a spectacle frame. The hinge structure comprises a pair of pivotally connected tongue members, one of which is attached to a temple and the other of which is attached to an end portion of the frontal lens carrying frame such that the temple is adapted to move pivotally both outwardly and inwardly relative to the frontal lens carrying frame. A slide member is associated with one of the tongue members of the hinge structure and is adapted to be moved and held in a desired one of a plurality of positions to limit the extent of outward pivotal movement of the temple relative to the frontal lens carrying frame.

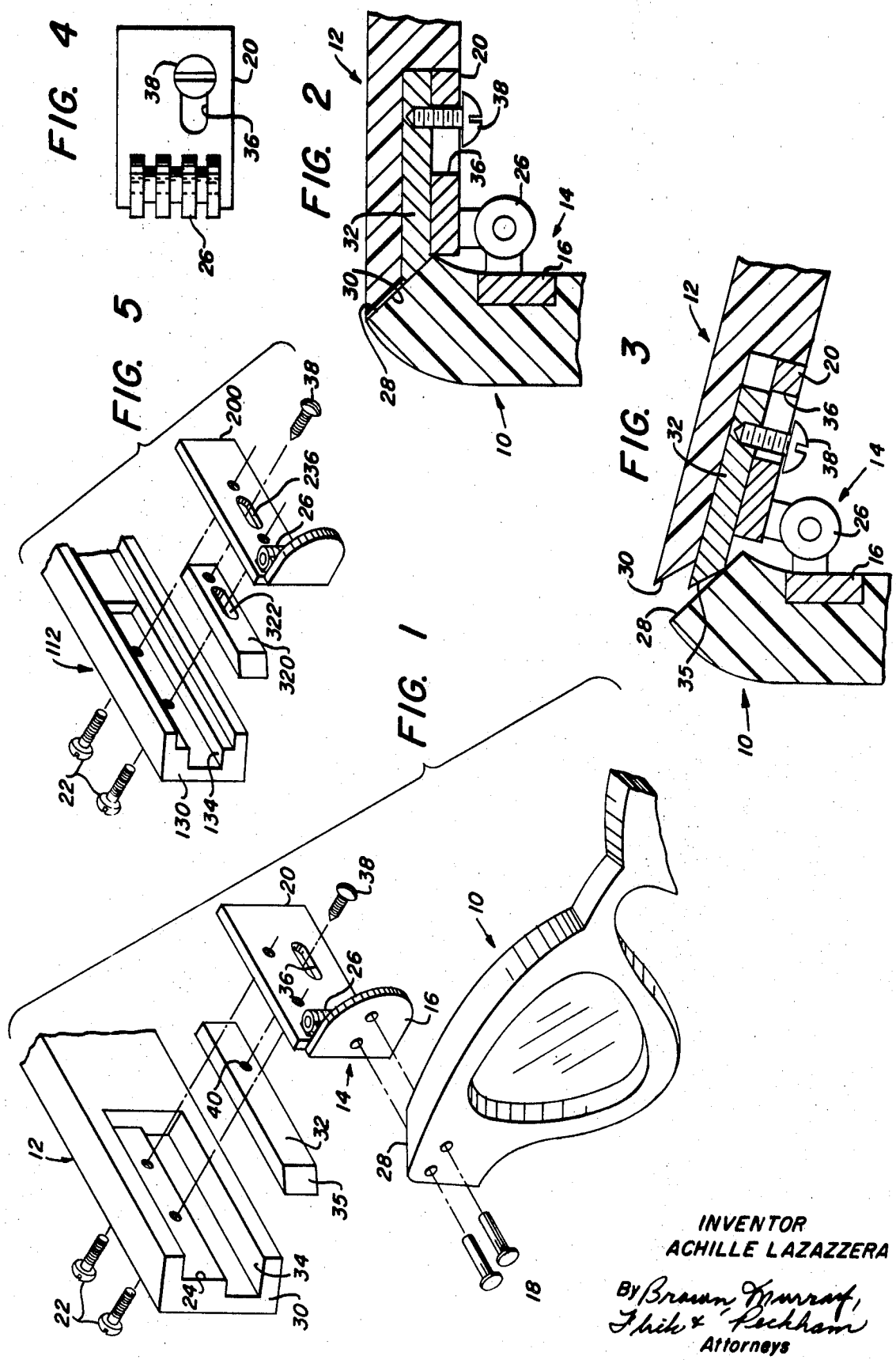

SPECTACLE FRAME

BACKGROUND OF THE INVENTION

The present invention relates to spectacle frames and more particularly to the combination of a spectacle frame comprising a frontal lens carrying frame and temples and a novel hinge structure for attaching the temples to the extremities of the frontal lens carrying frame.

It may be explained that spectacle frames, particularly the temple portions thereof, become deformed during normal usage. Such deformation generally causes the temples to only loosely engage the sides of the head of the person wearing the spectacles, and the frontal lens carrying frame of the spectacles, instead of riding high on the bridge of the nose, tends to slide forward, permitting the lenses to assume an undesirable position.

In an attempt to overcome this problem, various hinge structures have been proposed which maintain a pressure on the temples for pressing the temples against the side of the head and holding the spectacles in place; as an example of such hinge structures, see U.S. Pat. Nos. 2,756,632 and 3,243,248.

SUMMARY OF THE INVENTION

As an overall object, the present invention seeks to provide in combination with a spectacle frame, a hinge structure such that in the event of distortion of the temples so that desired pressure is no longer provided for pressing the temples against the side of the head for holding the spectacles in place, the temples can be readily adjusted by the user for restoring the desired pressure.

Briefly, the present invention provides in combination with a spectacle frame comprising a frontal lens carrying frame and temples, a hinge structure for attaching at least one of the temples to an extremity or end portion of the frontal lens carrying frame. The hinge tongues are attached to the inner side of an end portion of the frontal lens carrying frame and the adjacent end portion of the temple to permit both outward and inward pivotal movement of the temple relative to the frontal lens carrying frame. At least one of the tongue members has a longitudinal slotlike opening therethrough and has a slide member associated therewith which is disposed between it and the end portion to which it is attached. The slide member is adapted to be moved from a position where an end portion thereof is substantially flush with a terminal surface of the end portion with which it is associated to a position substantially protruding therefrom. An adjusting screw passes through the slotlike opening in the tongue member and is in threaded engagement with the slide member. The screw cooperates with the slide member and tongue member with which it is associated for holding the slide member in a desired one of a plurality of positions whereby the extent of protrusion of the end portion thereof from said terminal surface may be set to limit the extent of outward pivotal movement of the temple relative to the frontal lens carrying frame.

Other objects, features and advantages of the present invention will become apparent from the following description taken in conjunction with the accompanying drawings.

BRIEF DESCRIPTION OF THE DRAWINGS

FIG. 1 is an exploded perspective view of a spectacle frame and spectacle frame hinge structure in accordance with the invention;

FIG. 2 is an assembled top view in section of the spectacle frame and spectacle frame hinge illustrated in FIG. 1 showing the slide bar in its retracted position;

FIG. 3 is a view similar to FIG. 2 showing the slide bar in an extended position;

FIG. 4 is an elevation view of the tongue member attached to the temple of FIG. 2; and FIG. 5 is an exploded perspective view of a spectacle frame and modified spectacle frame hinge structure in accordance with the invention.

DESCRIPTION OF THE PREFERRED EMBODIMENTS

Referring now to the drawings wherein like reference numerals refer to like parts throughout the several views and particularly to FIGS. 1—4, a frontal lens carrying frame is indicated generally at 10. Since the invention is concerned with the hinge structure by which one or both of the temples is attached to the lens carrying frame 10, only a portion of this frame has been illustrated.

One of the temples is partly illustrated at 12. A hinge is shown generally at 14 which is used to attach the temple 12 to the end portions of the frame 10. The hinge 14 may be similar to hinges conventionally employed for such purposes except for the modifications to be described hereinafter.

The hinge 14 comprises a tongue member 16 which is attached to the inner side of the end portion of the lens frame 10 by suitable fasteners such as rivets 18. The other tongue member 20 is attached or secured to the inner side of the end portion of the temple 12 by fasteners, namely, screws 22. Other fasteners, such as rivets, can, of course, be used to secure the tongue member 20 to the spectacle frame.

Preferably, a recessed portion 24 is provided in the temple 12 to accommodate the tongue member 20 and a similar recess may, if desired, be provided in the lens frame 10 to accommodate the tongue member 16.

The tongue members 16, 20 are pivotally connected together in the conventional manner by means of a hinge pin 26. As will be understood to those skilled in the art, by reason of this arrangement, the tongue member 20 is adapted to permit both inward and outward pivotal movement of the temple 12 from a position approximately 90° to the frontal lens carrying frame 10 toward a position overlying the lens frame 10. Also, the end portion of the lens frame 10 presents a terminal surface 28 and the end portion of the temple 12 presents a terminal surface 30. When the temple 12 is disposed at approximately 90° to the lens frame 10, the terminal surfaces 28 and 30 are adapted and disposed to come into abutting contacting relation and when disposed in this relation the terminal surfaces 28 and 30 provide stop surfaces which cooperate with the hinge to prevent further pivotal movement of the temple 12 beyond the position approximately at 90° to the frontal lens carrying frame 10.

In accordance with the invention, means are provided in combination with the hinge 14 for providing adjustable stop means whereby to limit the angle that the temple 12 can make with the lens frame 10, when the temple has been pivoted outwardly, to less than approximately 90°. To this end, a slide member 32 is provided. The slide member 32 is disposed behind the tongue member 20 and is housed in a recessed portion 34 provided in the end portion of the temple 12. The recessed portion 34 extends to the terminal surface 30 and the slide member has a stop surface 34 conforming to the shape of the surface 30. The tongue member 20 has a slotlike opening 36 therethrough and an adjusting screw 38 passes through the opening 36 and is in threaded engagement with the slide member 32; the screw 38 being screwed into a tapped hole 40 provided in the slide member 32.

The adjusting screw 38 cooperates with the slide member 32 and tongue member 20 when it is screwed firmly into the tapped hole 40 for holding the slide member in position; however, with the screw 38 loosened, the slide member 32 together with adjusting screw 38 can be moved to the left as viewed in the drawings such that the beveled end portion or surface 35 of slide member 32 will protrude beyond the surface 30. As shown in FIG. 2, the slide member 32 can be positioned such that the surface 35 thereof will be flush with the surface 30, or as shown in FIG. 3, it can be positioned such that the surface 35 thereof protrudes beyond the surface 30. Of course, the slide member can be positioned in a desired one of a plurality of positions whereby the extent of protrusion of the surface 30 can be set.

When the surface 30 of the slide member 32 is in position substantially flush with with the terminal surface 30 of the temple 12, it is apparent that the limit of outward pivotal movement of the temple 12 relative to the frontal lens carrying frame 10 is determined when the surfaces 28 and 30 come into abutting contacting relation as is shown in FIG. 2. If the temple 12 does not exert sufficient pressure against the sides of the head of a particular user of the spectacle frame when the terminal surfaces 28 and 30 are in abutting contacting relation, then it is possible by sliding the slide member 32 to the left to cause the stop member 35 thereof to protrude from the surface 30 as is shown in FIG. 3. When the slide member 32 has been so positioned and set in place by firmly screwing screw 38 into tapped hole 40, it is apparent that the temple 12 will make a slightly lesser angle with respect to lens carrying frame 10 and the temple 12 will be held in closer proximity to the side of the head of the wearer. Accordingly, by adjusting the amount of protrusion of the stop surface 35 relative to the surface 30, the angle that the temple 12 makes with the lens carrying frame 10 can be adjusted as desired for maintaining the temple in pressure contact with the side of the head of the wearer so as to be comfortable and at the same time prevent accidental displacement of the spectacle frame.

In the embodiment of the invention just described, the fasteners 22 are disposed above the longitudinal axis of the temple 12. While this arrangement is suited for temples that are relatively wide in the height dimension, certain temples, such as would be provided on spectacles worn by women, are smaller or less wider in the height dimension. In order to adapt the hinge structure of the invention for use on such temples, the positioning of the fasteners, the slotlike opening in the tongue member and the slide member itself are arranged differently as is shown in FIG. 5. The fasteners 22 are longitudinally spaced apart, as in the embodiment of FIGS. 1—4; however; they are disposed centrally between the upper and lower edges of the tongue member 200. The longitudinal slotlike opening 236 is disposed between the fasteners 22 and is centrally located between the upper and lower edges of the tongue member 200. The slide member 320 has a longitudinal slotlike opening 322 located centrally between the upper and lower edges of the slide member 320 for accommodating the fastener 22 nearest to the terminal surface 130 of the temple 112. Finally, the recess 134 in the temple 112 is located centrally between the upper and lower edges of the temple 112.

The operation of the hinge structure illustrated in the embodiment of FIG. 5 is the same as that of the embodiment of FIGS. 1—4.

While specific preferred embodiments of the invention have been shown and described, it is apparent that the specific structure shown and described can be varied within the principles and scope of the invention. For example, the hinge parts or tongue members can be reversed with appropriate changes in the temple and lens carrying frame so that the slide member can be carried within a recess provided in the end portion of the lens carrying frame. With this arrangement, the slide member can be caused to protrude, when desired, from the terminal surface of the lens carrying frame to limit outward pivotal movement of the temple.

I claim:

1. In combination in a spectacle frame comprising a frontal lens carrying frame and temples, a hinge structure for attaching at least one of said temples to an extremity of said frontal lens carrying frame which comprises a hinge that has pivotally connected tongue members one of which is attached to the inner side of an end portion of said frontal lens carrying frame and the other of which is attached to the inner side of the adjacent end portion of said temple and that is adapted to permit both outward and inward pivotal movement of said temple relative to said front lens carrying frame, at least one of said tongue members having a longitudinal slotlike opening therethrough and having a slide member associated therewith which is disposed between it and the end portion to which it is attached, said slide member adapted to be moved from a position where a beveled end portion thereof is substantially flush with a terminal surface of the end portion with which it is associated to a position substantially protruding therefrom, an adjusting screw passing through said slotlike opening which is in threaded engagement with said slide member, said screw cooperating with said slide member and tongue member with which it is associated for holding said slide member in a desired one of a plurality of positions whereby the extent of protrusion of said end portion thereof from said terminal surface may be set to limit the extent of outward pivotal movement of said temple relative to said frontal lens carrying frame.

2. In combination in a spectacle frame comprising a frontal lens carrying frame and temples, a hinge structure according to claim 1 wherein said tongue member having a longitudinal slotlike opening therethrough is attached to the inner side of said end portion of said temple, said end portion of said temple having a recessed portion disposed behind said tongue member which extends to the terminal surface thereof, and said slide member is disposed within said recessed portion.

3. In combination in a spectacle frame comprising a frontal lens carrying frame and temples, a hinge structure according to claim 2 wherein said tongue member attached to the inner side of said end portion of said temple is secured thereto by means of a pair of longitudinally spaced-apart fasteners centrally disposed between the upper and lower edges of said tongue member, said longitudinal slotlike opening being disposed between said fasteners and centrally located between the upper and lower edges thereof for accommodating one of said fasteners.

4. In combination in a spectacle frame comprising a frontal lens carrying frame and temples, a hinge structure according to claim 2 wherein said tongue member attached to the inner side of said end portion of said temple is secured thereto centrally between the upper and lower edges thereof by means of a pair of longitudinally spaced-apart fasteners centrally disposed between the upper and lower edges of said tongue member, said longitudinal slotlike opening being disposed between said fasteners and centrally located between the upper and lower edges of said tongue member, and said slide member having a longitudinal slotlike opening centrally located between the upper and lower edges thereof for accommodating the fastener nearest to said terminal surface of said temple.

5. In combination in a spectacle frame comprising a frontal lens carrying frame and temples, a hinge structure for attaching at least one of said temples to an extremity of said frontal lens carrying frame which comprises a hinge that has pivotally connected tongue members one of which is attached to the inner side of an end portion of said frontal lens carrying frame and the other of which is attached to the inner side of the adjacent end portion of said temple and that is adapted to permit pivotal movement of said temple from a position approximately 90° to said frontal lens carrying frame toward a position overlying said frontal lens carrying frame, said end portion of said frontal lens carrying frame and said end portion of said temple presenting terminal surfaces which are adapted and disposed to come into opposed relation when said temple is in said position approximately 90° to said frontal lens carrying frame and cooperate with said hinge to prevent pivotal movement of said temple beyond said approximately 90° position, said end portion of said temple having a recessed portion disposed behind the tongue member attached thereto which extends to the terminal surface thereof, said tongue member attached to said end portion of said temple having a slotlike opening therethrough, a slide member disposed within said recessed portion and adapted to be moved from a position where an end portion thereof is substantially flush with the terminal surface of said end portion of said temple to a position substantially protruding therefrom for contact with said terminal surface of said end portion of said lens carrying frame, and an adjusting screw passing through said slotlike opening which is in threaded engagement with said slide member, said screw cooperating with said slide member and said tongue member attached to said end portion of said temple for holding said slide member in a desired one of a plurality of positions whereby the extent of protrusion of said end portion thereof from said terminal surface of said end portion of said temple may be set to limit the extent of pivotal movement of said temple to a position less than said approximately 90° position.